UNITED STATES PATENT OFFICE.

JULES ADOLPHE BESSON, OF CAEN, FRANCE.

PROCESS OF DEFECATING SUGAR-JUICE.

SPECIFICATION forming part of Letters Patent No. 710,413, dated October 7, 1902.

Application filed January 18, 1901. Serial No. 43,776. (No specimens.)

*To all whom it may concern:*

Be it known that I, JULES ADOLPHE BESSON, a citizen of the Republic of France, and a resident of Caen, France, have invented certain new and useful Improvements in Processes of Defecating Sugar-Juice, of which the following is a specification.

The improved process consists in adding to heated sugar juice or syrup a small quantity of ammonia or ammonia salts, filtering the mass, and submitting the same to the action of finely-divided metals having a large active surface. I preferably employ ammonia salts capable of precipitating lime—such as carbonate, sulfate, phosphate, fluorid, borate, oxalate, tartrate, stearate, &c., or a mixture of these salts, ammonia soap, ammonia superphosphate, &c. I may also employ acid and ammonia instead of the salt already formed.

In order to make my invention more readily understood, I will now describe some examples.

First, during the diffusion or the carbonating process I add to the sugar-juice a small quantity of ammonia or other similar base capable of almost totally precipitating the lime with the aid of anhydrous carbonic gas, while a proper alkalinity is maintained, or, second, I add to the completely-carbonated juice ammonium oxalate, or, separately, oxalic acid and ammonia, or, third, I add to the carbonated juice a decoction of superphosphate until the mixture is slightly acid, this mixture being then neutralized by means of ammonia. These operations may be combined. The action of the metal on the filtered solution takes place, preferably, during the concentration, and I preferably employ light finely-divided metals, such as porphyrized aluminium.

The mixture is thoroughly shaken and then brought to the concentration apparatus.

The precipitation of the lime of the juices is facilitated by the presence of ammonia, for the following reasons: The lime of the filtered juices is present in these juices in different states—namely, the state of a sucrate of lime or the state of salts of lime, (multiple organic acids.) The sucrate of lime as well as certain organic acid salts of lime can be partially or totally decomposed by carbonic-acid gas, which is customarily introduced, and consequently a chemical equilibrium would be eventually established, limiting the precipitation of the lime by the carbonic-acid gas. This equilibrium is destroyed by the addition of ammonia or ammoniacal salts, such as the carbonate, the base of which takes the place of the lime in the stabler salts, so that the elimination of the lime is effected more thoroughly and rapidly than is possible without the addition of ammonia.

The improved process has two main advantages. The slight production of gas, which takes place when the sugar solution is brought into contact with the metal, facilitates boiling, so that the concentration is readily effected at a lower temperature, and when the filtered syrup flows out from the concentration apparatus it is in a clear, uncolored, and exceedingly pure state.

Having thus described my invention, what I claim, and desire to secure by Letters Patent, is—

1. The improved process of purifying sugar juice and syrup, which consists in adding ammonia to the latter, filtering the solution, and mixing it with a finely-divided metal, substantially as set forth.

2. The improved process of cleaning sugar-juice syrup which consists in adding to the latter acid and ammonia, filtering the solution and mixing the filtered solution with finely-divided metals, substantially as set forth.

In testimony whereof I have hereunto set my hand in presence of two witnesses.

JULES ADOLPHE BESSON.

Witnesses:
   EDWARD P. MACLEAN,
   GEORGE E. LIGHT.